(12) United States Patent
Son et al.

(10) Patent No.: US 8,791,798 B2
(45) Date of Patent: Jul. 29, 2014

(54) HAPTIC FEEDBACK DEVICE

(71) Applicant: Samsung Electro-Mechanics Co., Ltd., Gyunggi-do (KR)

(72) Inventors: Yeon Ho Son, Gyunggi-do (KR); Dong Sun Park, Gyunggi-do (KR); Jae Kyung Kim, Gyunggi-do (KR); Dae Woong Yun, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 69 days.

(21) Appl. No.: 13/677,932

(22) Filed: Nov. 15, 2012

(65) Prior Publication Data
US 2013/0141225 A1 Jun. 6, 2013

(30) Foreign Application Priority Data
Nov. 16, 2011 (KR) .................. 10-2011-0119577

(51) Int. Cl.
*G08B 6/00* (2006.01)
(52) U.S. Cl.
USPC .......... 340/407.1; 340/4.12; 715/702; 463/30
(58) Field of Classification Search
USPC ............ 340/407.1, 407.2, 4.12, 7.6; 345/156, 345/173; 715/701, 702; 463/30
See application file for complete search history.

(56) References Cited

U.S. PATENT DOCUMENTS

2008/0122315 A1* 5/2008 Maruyama et al. ........... 310/314
2013/0033366 A1* 2/2013 McDonough et al. ..... 340/407.1

FOREIGN PATENT DOCUMENTS

| KR | 10-2005-0031854 A | 4/2005 |
| KR | 10-2009-0127985 | 12/2009 |
| KR | 10-1016208 B1 | 2/2011 |
| KR | 10-2011-0045486 A | 5/2011 |
| KR | 2011-0094722 A | 8/2011 |

OTHER PUBLICATIONS

Korean Office Action, and English translation thereof, issued in Korean Patent Application No. 10-2012-0149895 dated Feb. 21, 2013.
Korean Office Action issued in Korean Application No. 10-2011-0119577, mailed on Oct. 26, 2012.

* cited by examiner

*Primary Examiner* — Toan N Pham
(74) *Attorney, Agent, or Firm* — McDermott Will & Emery LLP (57) ABSTRACT

There is provided a haptic feedback device, including: a vibrating member coupled to a fixed body; and a vibrating element formed on the vibrating member to vibrate the vibrating member, wherein the vibrating member has a plurality of fixed points coupled to the fixed body while allowing a length thereof, vibrated by the vibrating element, to be changed.

27 Claims, 9 Drawing Sheets

HAPTIC FEEDBACK DEVICE

CROSS-REFERENCE TO RELATED APPLICATIONS

This application claims the priority of Korean Patent Application No. 10-2011-0119577 filed on Nov. 26, 2011, in the Korean Intellectual Property Office, the disclosure of which is incorporated herein by reference.

BACKGROUND OF THE INVENTION

1. Field of the Invention

The present invention relates to a haptic feedback device, and more particularly, to a haptic feedback device capable of controlling a vibration frequency.

2. Description of the Related Art

In order to increase user convenience, a touch-type device providing touch acknowledgement (for example, a haptic feedback device), in which a user touches selection buttons or icons displayed on a screen thereof, has become generalized.

The haptic feedback device, a unit allowing users to feel haptic feedback from the screen using their fingers, may provide convenient functions that enable users to provide input signals with tactile confirmation thereof.

The haptic feedback device can save space, improve operability and simplicity, and facilitate user recognition. In addition, the haptic feedback device can improve interoperability with IT devices. For this reason, the haptic feedback device has been frequently used as an input-output unit of a guide device that guides users to public places they desire to visit (for example, subway stations, hospitals, schools, or the like).

Meanwhile, the haptic feedback device is provided as a unit to inform a user whether input signals have been received or whether output signals have been sent. The haptic feedback device includes a vibrating element (for example, a piezoelectric element) and a vibrating member vibrated thereby.

In this configuration, a vibrating member is manufactured to have a thin plate shape and thus, deviations in a length and a thickness thereof may occur according to a manufacturing process. Further, the deviations in the length and the thickness may affect the vibration frequency, and thus, the haptic feedback device may be vibrated outside of a predetermined vibration band. As a result, these vibrations may cause user inconvenience.

However, since the haptic feedback device according to the related art does not include a structure that can correct an incorrect vibration frequency, the haptic feedback device operating outside of a predetermined vibration band should be discarded.

SUMMARY OF THE INVENTION

An aspect of the present invention provides a haptic feedback device capable of easily calibrating or controlling a vibration frequency of a haptic feedback device having a vibration frequency band outside of a design specification due to manufacturing tolerance.

According to an aspect of the present invention, there is provided a haptic feedback device, including: a vibrating member coupled to a fixed body; and a vibrating element formed on the vibrating member to vibrate the vibrating member, wherein the vibrating member and the fixed body are coupled at a plurality of fixed points able to be variably positioned to allow a length of the vibrating member, vibrated by the vibrating element, to be changed.

The plurality of fixed points may be formed in a length direction of the vibrating member.

The plurality of fixed points may be welding points at which the vibrating member is bonded to the fixed body.

The plurality of fixed points may be holes formed in the vibrating member.

The plurality of fixed points may be grooves formed in end portions of the vibrating member.

The haptic feedback device may further include a first mass member provided to the vibrating member.

The first mass member may have a coupling structure so as to be coupled to a second mass member.

The first mass member may include an insertion hole into which the second mass member is inserted.

The first mass member may include a protrusion or a groove so as to be coupled to the second mass member, and the second mass member may include a groove or a protrusion corresponding to the protrusion or the groove of the first mass member.

The second mass member may be an adhesive having a predetermined mass, and the first mass member may include a receiving space for the adhesive.

According to another embodiment of the present invention, there is provided a haptic feedback device, including: a vibrating member; and a vibrating element formed on the vibrating member to vibrate the vibrating member, wherein the vibrating member has a structure in which a plurality of vibrating plates are connected in parallel in a width direction of the vibrating member.

The vibrating member may be divided into the plurality of vibrating plates by a separating groove extending in a length direction of the vibrating member.

The plurality of vibrating plates may be provided with a plurality of holes in a length direction thereof.

The plurality of vibrating plates may be integrally formed with the vibrating member by a pressing process.

The haptic feedback device may further include a first mass member provided to the vibrating member.

The haptic feedback device may further include a second mass member having a predetermined mass, and the second mass member may be an adhesive so as to be bonded to the first mass member.

The first mass member may have a coupling structure so as to be coupled to the second mass member.

The first mass member may include an insertion hole into which the second mass member is inserted.

The first mass member may include a protrusion or a groove so as to be coupled to the second mass member, and the second mass member may include a groove or a protrusion corresponding to the protrusion or the groove of the first mass member.

According to another embodiment of the present invention, there is provided a haptic feedback device, including: a vibrating member; a vibrating element formed on the vibrating member to vibrate the vibrating member; a first mass member provided to the vibrating member; and a second mass member selectively coupled to the first mass member.

The first mass member may include an insertion hole into which the second mass member is inserted.

The first mass member may include a protrusion or a groove so as to be coupled to the second mass member, and the second mass member may include a groove or a protrusion corresponding to the protrusion or the groove of the first mass member.

The vibrating member may include a first plate member elongated in a first direction, and a pair of second plate members extended from both sides of the first plate member and bent in a second direction perpendicular to the first direction so as to be coupled to the first mass member.

The haptic feedback device may further include an upper case and a lower case receiving the first mass member and the vibrating member.

The upper case may include a receiving groove.

The second mass member having a predetermined mass and being curable at room temperature may be provided in the first mass member through the receiving groove.

According to another embodiment of the present invention, there is provided a haptic feedback device, including: a vibrating member coupled to a fixed body while having a first vibrating length due to a first fixed point; a vibrating element formed on the vibrating member to vibrate the vibrating member; and at least one second fixed point at which the vibrating member is coupled to the fixed body while having a second vibrating length different from the first vibrating length.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Hereinafter, embodiments of the present invention will be described in detail with reference to the accompanying drawings.

In describing the present invention below, terms indicating components of the present invention are named in consideration of functions thereof. Therefore, the terms should not be understood as limiting technical components of the present invention.

A vibrating member among components configuring a haptic feedback device may be manufactured to have a thin plate shape. This vibrating member may be easily deformed elastically due to external force and thus, may obtain a good vibration effect due to the vibrating element.

However, the plate-shaped vibrating member may be easily deformed by heat and external impacts, such that the vibration frequency of the haptic feedback device may be easily changed.

Further, the deformation of the vibrating member may cause defects in the haptic feedback device and thus, the manufacturing yield of the haptic feedback device may be degraded and a vibration frequency causing user inconvenience may be generated.

In order to solve the above-mentioned problems, a haptic feedback device capable of easily controlling or calibrating a vibration frequency of the haptic feedback device varied according to the deformation of the vibrating member may be provided.

For example, the vibration frequency of the haptic feedback device may be calibrated by changing a spring constant of the vibrating member or a mass of a vibrating object (a body including a vibrating member and a vibrating element) vibrating member according to the embodiment of the present invention. The haptic feedback device allowing for changes in the spring constant of the vibrating member and the mass of the vibrating object may be provided.

Figure 1:
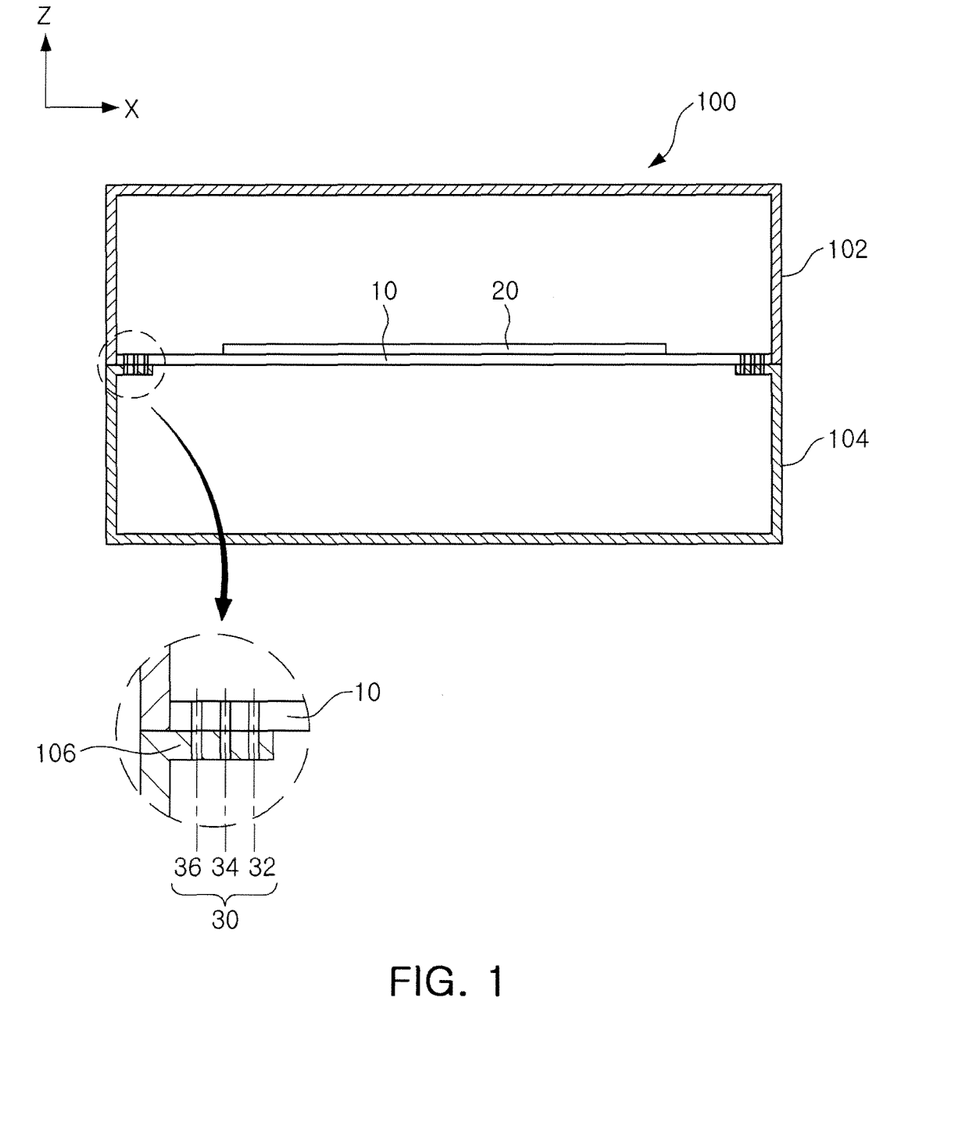
FIG. 1 is a cross-sectional view of a haptic feedback device according to a first embodiment of the present invention.
Figure 2:
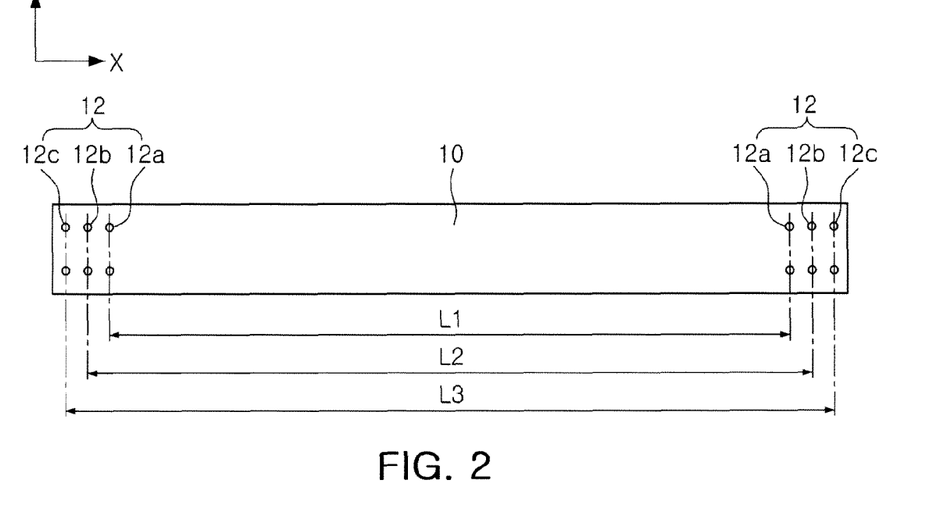
FIG. 2 is a plan view showing a vibrating member of the haptic feedback device shown in FIG. 1.
Figure 3:
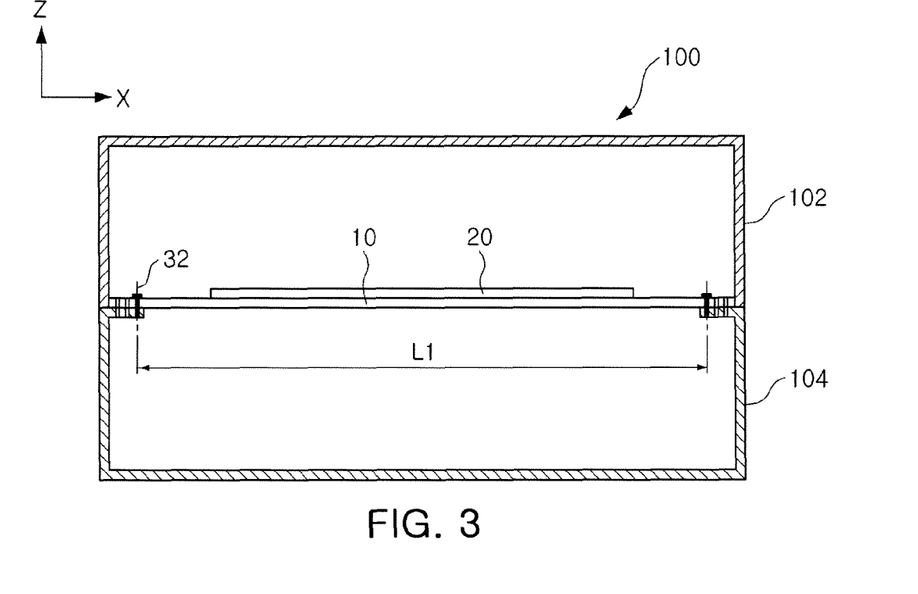
FIGS. 3 and 4 are cross-sectional views of the haptic feedback device for describing a vibrating amplitude of a vibrating member according to a change in a plurality of fixed points.
Figure 4:
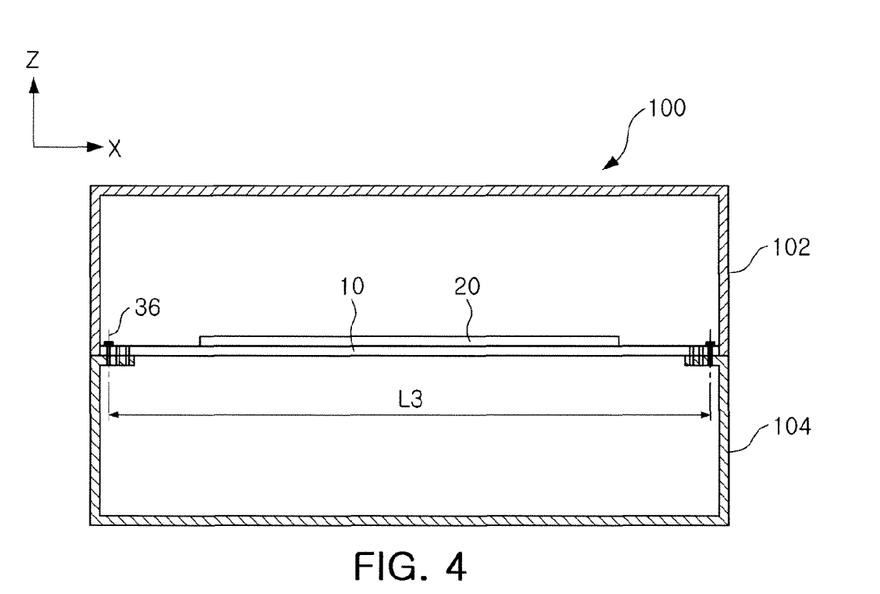
Figure 5:
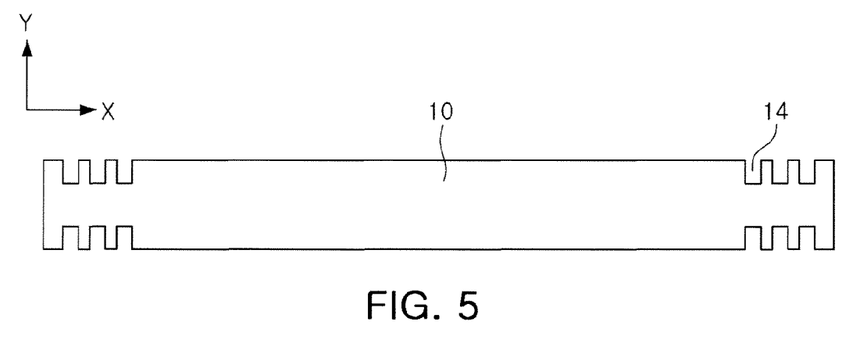
FIGS. 5 and 6 are plan views showing a modified shape of the vibrating member according to the first embodiment of the present invention.
Figure 6:
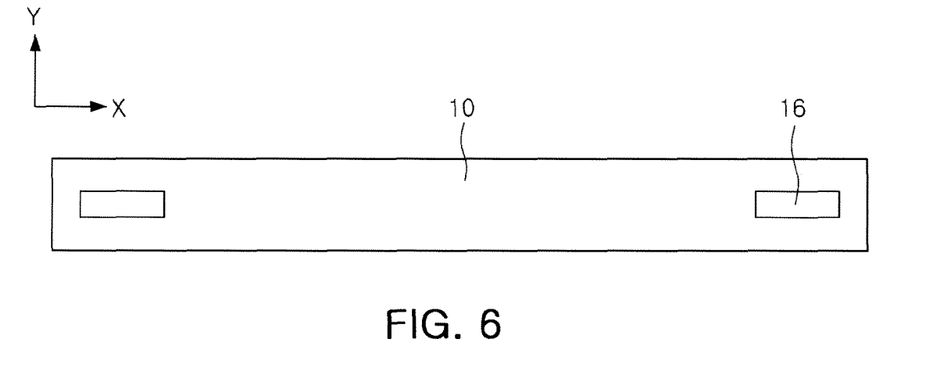
Figure 7:
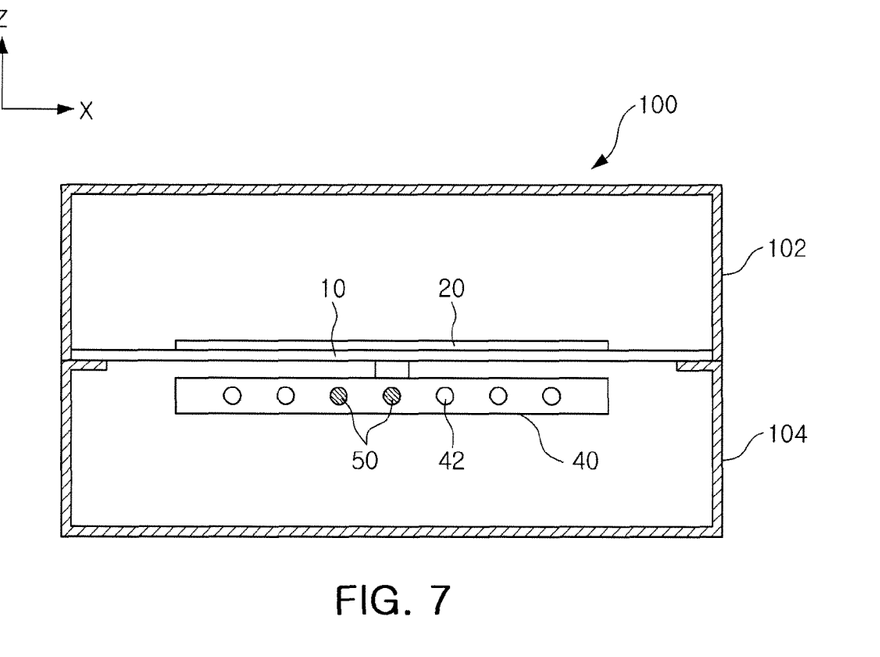
FIG. 7 is a cross-sectional view of a haptic feedback device according to a second embodiment of the present invention.
Figure 8:
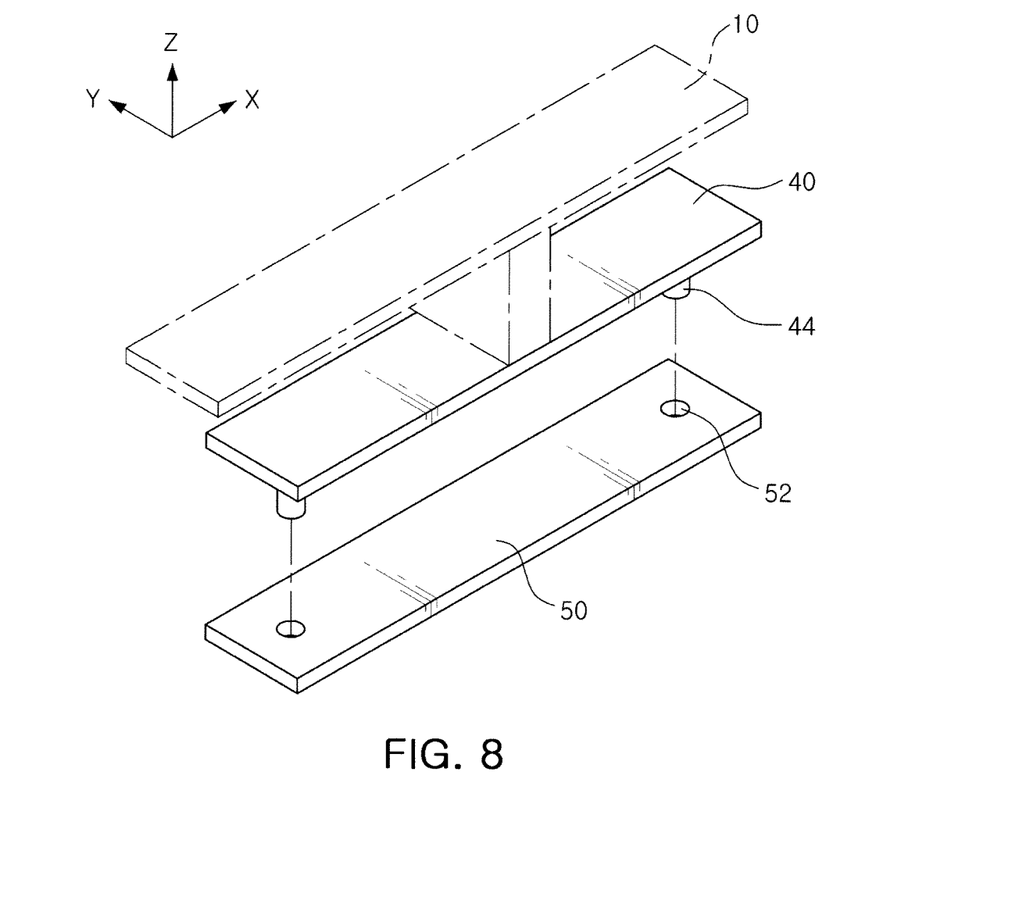
FIGS. 8 and 9 are perspective views showing a modified shape of a mass member according to the second embodiment of the present invention.
Figure 9:
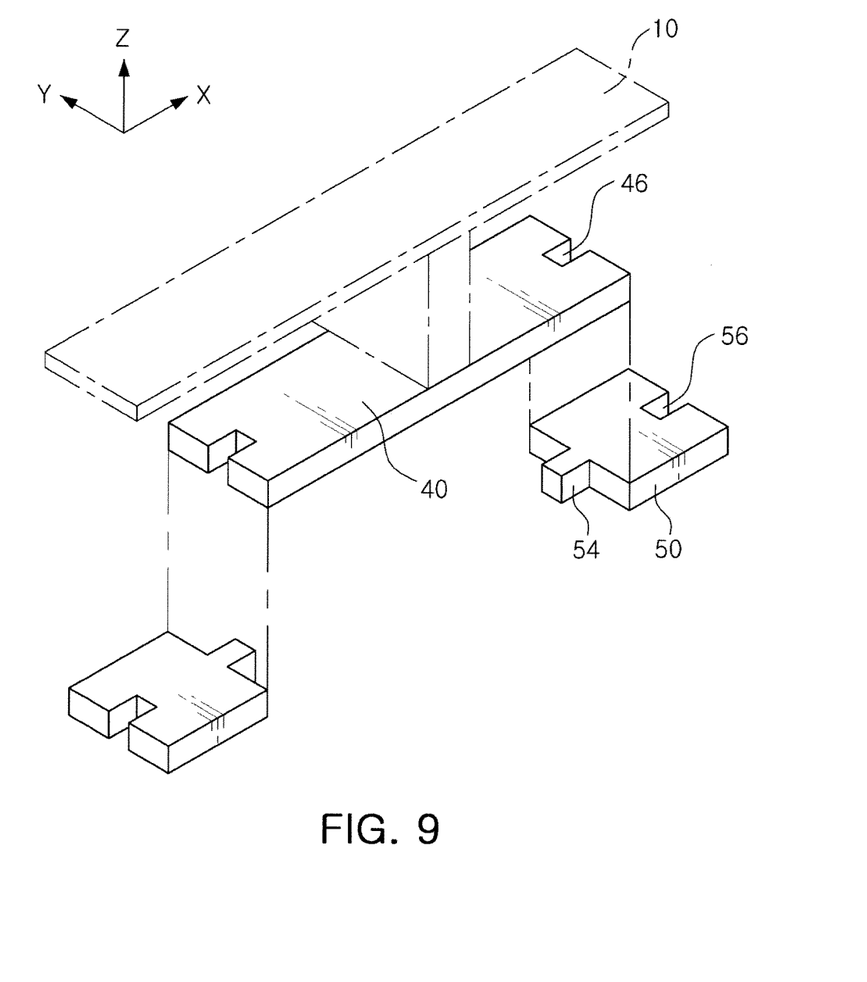
Figure 10:
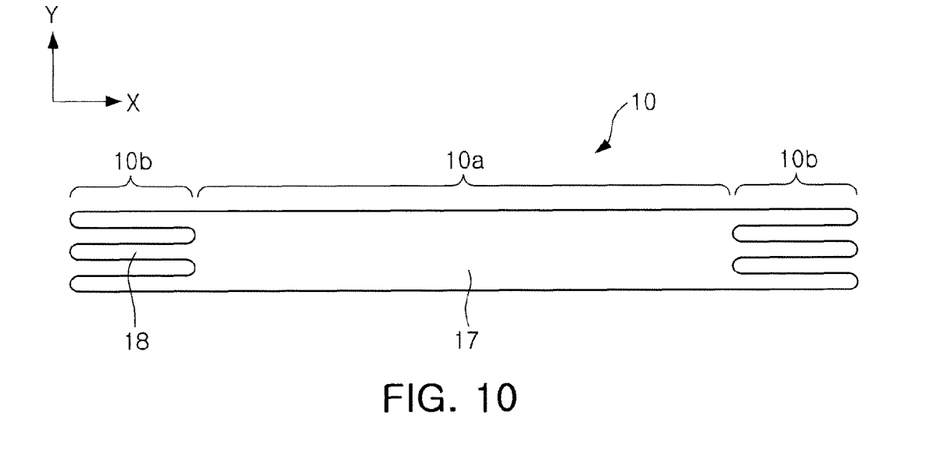
FIG. 10 is a plan view showing a vibrating member of a haptic feedback device according to a third embodiment of the present invention.
Figure 11:
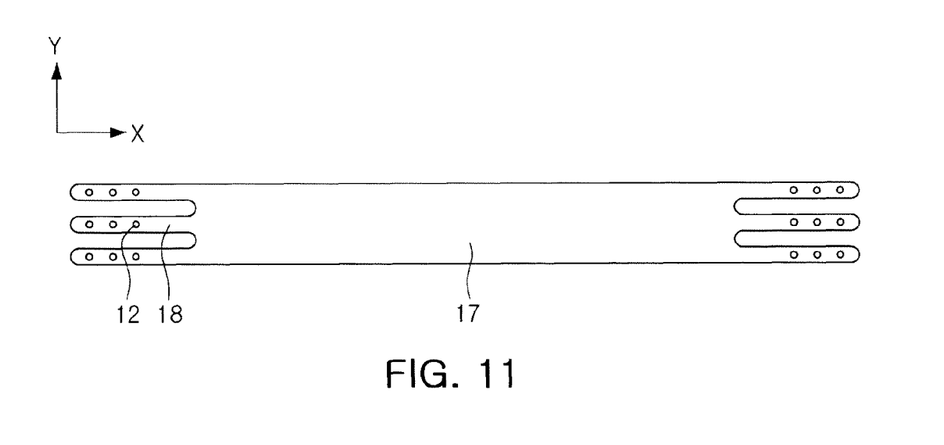
FIG. 11 is a plan view showing a modified shape of a vibrating member according to a third embodiment of the present invention.
Figure 12:
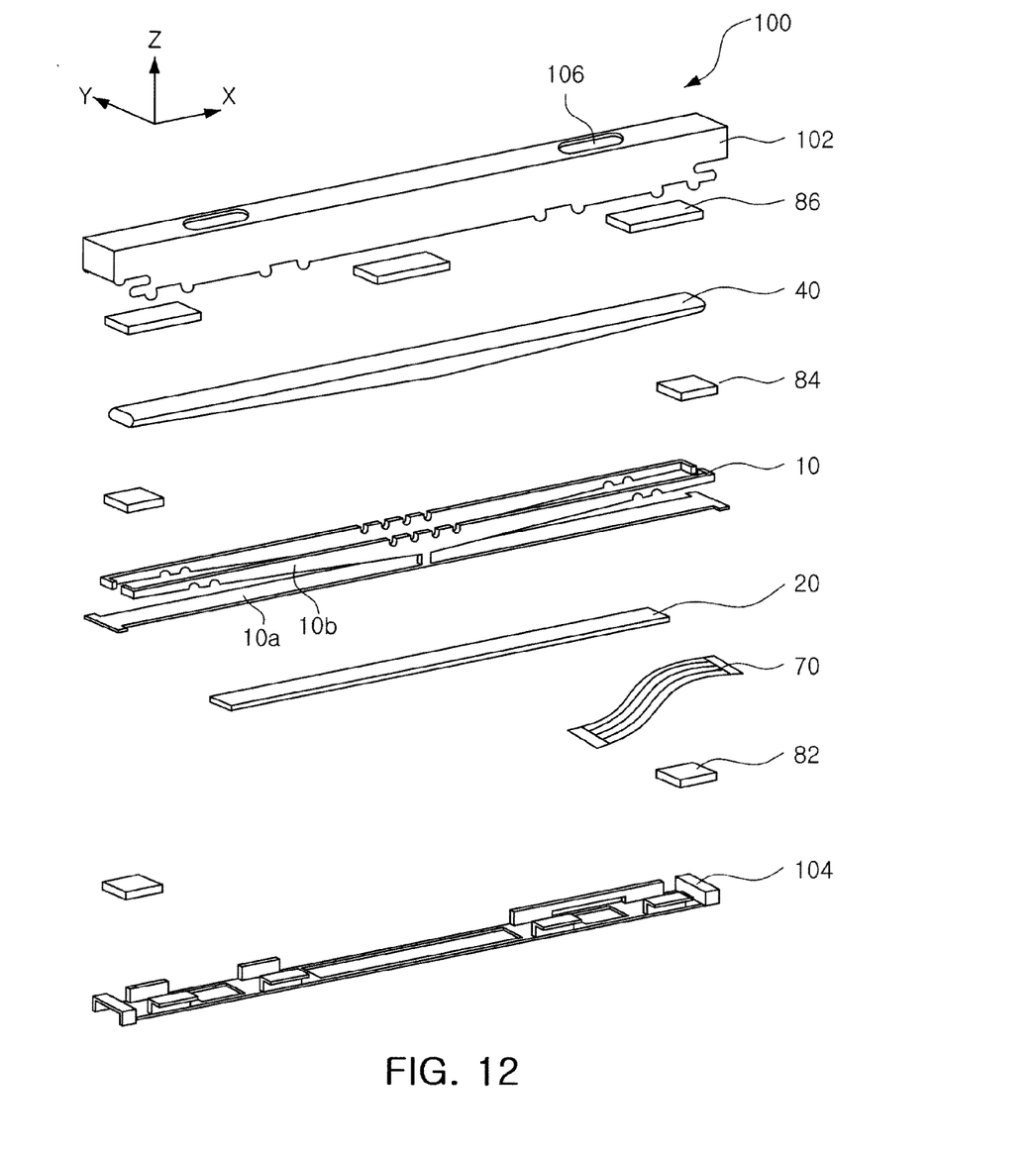
FIG. 12 is an exploded perspective view of a haptic feedback device according to a fourth embodiment of the present invention.
Figure 13:
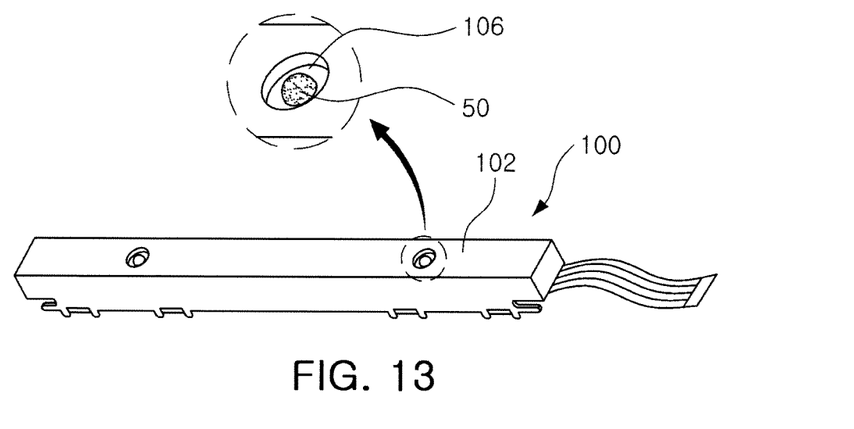
FIG. 13 is an assembled perspective view of the haptic feedback device shown in FIG. 12.
Figure 14:
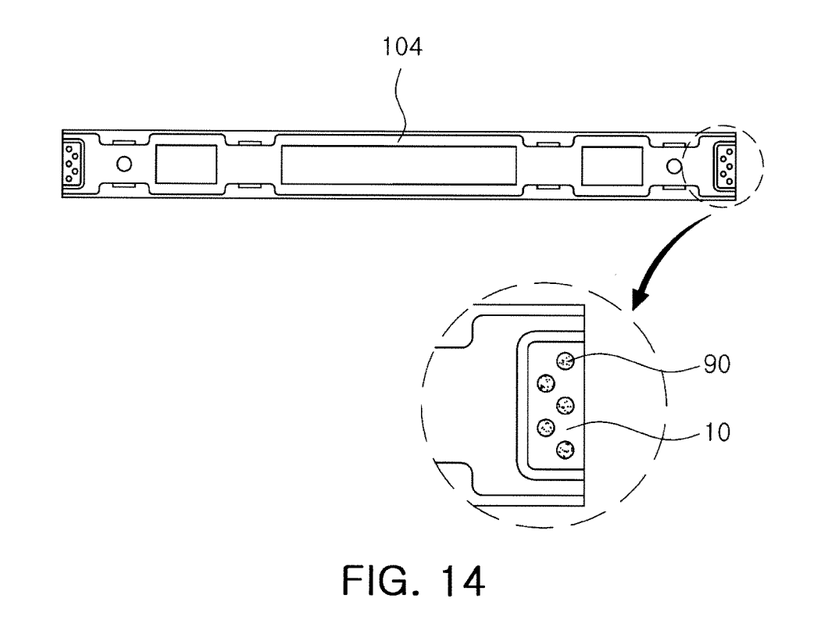
FIG. 14 is a bottom view of the haptic feedback device shown in FIG. 13.

FIG. 1 is a cross-sectional view of a haptic feedback device according to a first embodiment of the present invention, FIG. 2 is a plan view showing a vibrating member of the haptic feedback device shown in FIG. 1, FIGS. 3 and 4 are cross-sectional views of the haptic feedback device for describing a vibrating amplitude of a vibrating member according to a change in a plurality of fixed points, FIGS. 5 and 6 are plan views showing a modified shape of the vibrating member according to the first embodiment of the present invention, FIG. 7 is a cross-sectional view of a haptic feedback device according to a second embodiment of the present invention, FIGS. 8 and 9 are perspective views showing a modified shape of a mass member according to the second embodiment of the present invention, FIG. 10 is a plan view showing a vibrating member of a haptic feedback device according to a third embodiment of the present invention, FIG. 11 is a plan view showing a modified form of a vibrating member according to a third embodiment of the present invention, FIG. 12 is an exploded perspective view of a haptic feedback device according to a fourth embodiment of the present invention, FIG. 13 is an assembled perspective view of the haptic feedback device shown in FIG. 12, and FIG. 14 is a bottom view of the haptic feedback device shown in FIG. 13.

A haptic feedback device according to a first embodiment of the present invention will be described with reference to FIGS. 1 through 6.

A haptic feedback device 100 according to a first embodiment of the present invention may include cases 102 and 104, a vibrating member 10, and a vibrating element 20. The haptic feedback device 100 may be mounted in a mobile phone and other portable electronic devices such as a portable electronic dictionary.

In addition, the haptic feedback device 100 may be connected to an input-output unit of the corresponding electronic device to send vibration signals to users. However, without being limited to the above-mentioned portable electronic devices, the haptic feedback device 100 according to the embodiment of the present invention may be installed in an automatic teller machine (ATM) including a touch screen, a subway route guide apparatus, or the like. Further, the haptic feedback device 100 may be mounted in other electronic devices requiring output of vibration signals.

The case may include an upper case 102 and a lower case 104. The cases 102 and 104 may protect the haptic feedback device 100 from external impacts. To this end, the cases 102 and 104 may be formed of an impact-resistant metal material. However, in order to reduce the weight of the haptic feedback device 100, the haptic feedback device may be formed of a plastic material. In this case, the plastic material may include an impact-resistant component.

The cases 102 and 104 may be separated from and coupled to an electronic device in which the haptic feedback device 100 is to be mounted. Alternatively, at least a portion (for example, the upper case 102 or the lower case 104) of the cases 102 and 104 may be integrally formed with the portable electronic device (for example, a mobile phone) in which the haptic feedback device 100 is mounted. Alternatively, the upper case 102, the lower case 104, or the upper and lower cases 102 and 104 may be a portion of the portable electronic device.

Further, the cases 102 and 104 may include an electrode for receiving electric signals from the portable electronic device. The electrode may be formed outside of the cases 102 and 104 and may supply current to the vibrating element 20 mounted therein.

The upper case 102 and the lower case 104 may be coupled to and separated from each other. For example, the upper case 102 and the lower case 104 may be coupled to each other by a bolt and a nut. Alternatively, the upper case 102 and the lower case 104 may be coupled to each other by a separate press-fit structure (for example, protrusions and grooves).

The lower case 104 may include a protrusion portion 106. The protrusion portion 106 may support the vibrating member 10 and include a plurality of coupling holes for coupling with the vibrating member 10.

Meanwhile, the accompanying drawings show the case in which the haptic feedback device 100 includes the cases 102 and 104. However, the cases 102 and 104 may be omitted according to types of electronic devices in which the haptic feedback device 100 is mounted. In this case, the cases 102 and 104 may be replaced with a body of the electronic device.

The vibrating member 10 may be formed as a thin plate having an approximately rectangular shape. However, the vibrating member 10 may have any shape other than rectangular so long as the vibrating member 10 may be subjected to vertical vibrations.

The vibrating member 10 may be formed of a material having a predetermined elasticity. For example, the vibrating member 10 may be formed of a metallic material, a plastic material, or the like. Further, a spring constant K of the vibrating member 10 may be determined by allowing the haptic feedback device 100 to have a vibration frequency within a predetermined range of 100 to 300 Hz. For example, a length and a thickness of the vibrating member 10 may be controlled to allow the haptic feedback device 100 to have a vibration frequency of 100 to 300 Hz.

The vibrating member 10 may be fixed to the cases 102 and 104. Specifically, both ends of the vibrating member 10 may be coupled to the cases 102 and 104. For reference, in the present embodiment of the invention, the vibrating member 10 may be coupled to the lower case 104. However, in another embodiment, the vibrating member 10 may be coupled to the upper case 102 and may be coupled to both the upper case 102 and the lower case 104.

Meanwhile, in the present embodiment of the invention, the coupling position (hereinafter, referred to as fixed points 30) of the vibrating member 10 and the cases 102 and 104 may be changed.

To this end, the vibrating member 10 has a plurality of fixed points 30 (32, 34, and 36) with respect to the cases 102 and 104. The fixed points may be a plurality of fastening holes 12 (12a, 12b, and 12c). Alternatively, the fixed points may be welding points at which the vibrating member 10 is boned to the cases 102 and 104.

Holes 12 may be symmetrically formed in both end portions of the vibrating member 10. Further, the holes 12 (12a, 12b, and 12c) may be formed in a length direction (an X-axis direction based on FIG. 2) of the vibrating member 10 with a predetermined distance therebetween and may be formed in a plurality of columns in a Y-axis direction.

For reference, a distance between first holes 12a may be L1, a distance between second holes 12b may be L2, and a distance between third holes 12c may be L3. Further, the distance L3 may be greater than the distance L2 and the distance L2 may be greater than the distance L1.

The above-mentioned holes 12 (12a, 12b, and 12c) are fastened with bolts or pins, such that the vibrating member 10 may be fixed to the cases 102 and 104. Alternatively, the holes 12 (12a, 12b, and 12c) may be used as space for welding of the vibrating member 10 and the cases 102 and 104. However, the coupling method between the vibrating member 10 and the cases 102 and 104 is not limited to the above-mentioned method and may be changed within a range recognizable by those skilled in the art.

As described above, the vibrating member 10 including the plurality of holes 12 (12a, 12b, and 12c) may be coupled to a fixed point among the plurality of fixed points 30 (32, 34, and 36) via the holes 12 (12a, 12b, and 12c).

For example, as shown in FIG. 3, the vibrating member 10 may be fixed to the lower case 104 by using the first hole 12a as a first fixed point 32 and as shown in FIG. 4, may be fixed to the lower case 104 by using a third hole 12c as a third fixed point 36.

Meanwhile, the shape of the vibrating member 10 may be modified as shown in FIGS. 5 and 6. That is, the vibrating member 10 may have a plurality of grooves 14 formed in side surfaces thereof or may have grooves 16 formed therein in the length direction.

The vibrating member 10 having the aforementioned shape may be easily manufactured by a pressing process and the fixed point with respect to the cases 102 and 104 may be easily changed.

The vibrating element 20 may be fixed to the vibrating member 10. For example, the vibrating element 20 may be attached to the vibrating member 10 by an adhesive. Herein, the adhesive may be an epoxy resin material or a UV cure resin material. Further, the vibrating element 20 may be fixed to the vibrating member 10 using a mechanical structure. To this end, the vibrating member 10 may be provided with receiving grooves into which the vibrating element 20 may be inserted. In addition, the vibrating member 10 may be provided with protrusions for fixing the position of the vibrating element 20.

The vibrating element 20 may be a piezoelectric element that may be easily contracted and expanded according to electrical signals. For example, the vibrating element 20 may be formed of a lead zirconium titanate ceramic (PZT). The vibrating element may be contracted and expanded according to the electrical signals and may provide vibrations to the vibrating member 10.

The vibrating element 20 may be elongated in the length direction of the vibrating member 10. In other words, the vibrating element 20 may be disposed at the center of the vibrating member 10 so as not to affect the vertical vibrations of the vibrating member 10. Further, the vibrating element 20 may be shorter than the vibrating member 10.

In the present embodiment, the fixed point of the vibrating member 10 may be changed as described above. Here, the change in the fixed point means a change in the length of the vibrating member 10 to be substantially vibrated, and thus, it means a change in a substantial spring constant of the vibrating member 10.

$$K = E\frac{A}{L} \qquad \text{Equation 1}$$

Here, K is the spring constant of the vibrating object (or vibrating member), E is an elastic modulus of the vibrating object, A is a sectional area of the vibrating object, and L is the length of the vibrating object.

$$f = 2\pi\sqrt{\frac{K}{M}} \qquad \text{Equation 2}$$

Here, K is the spring constant of the vibrating object, and M is a mass of the vibrating object.

That is, as can be appreciated from Equation 1, the spring constant K of the vibrating member 10 is in inverse proportion to the length (a substantially vibrated length—a distance between fixed points) of the vibrating member 10.

Therefore, when the distance between the fixed points of the vibrating member 10 is increased (the case of FIG. 4), the length of the substantially vibrated portion in the vibrating member 10 is increased, such that the substantial spring constant K of the vibrating member 10 (referring to the spring constant of the vibrated portion based on the fixed points in the vibrating member 10) may be reduced and the vibration frequency of the haptic feedback device 100 may be reduced (see Equation 2).

Unlike this, when the distance between the fixed points of the vibrating member 10 is reduced (the case of FIG. 3), the length of the substantially vibrated portion is reduced in the vibrating member 10, such that the spring constant K of the vibrating member 10 may be increased and the vibration frequency of the haptic feedback device 100 may be increased.

Therefore, according to the embodiment of the present invention, when the vibration frequency of the manufactured haptic feedback device 100 is lower or higher than a predetermined vibration frequency band, the fixed points of the vibrating member 100 are changed and thus, the vibration frequency of the haptic feedback device 100 may be changed to the predetermined vibration frequency band.

Next, a haptic feedback device according to a second embodiment of the present invention will be described with reference to FIGS. 7 through 9.

The haptic feedback device 100 according to the present embodiment of the invention may further include a plurality of mass members 40 and 50.

As can be appreciated from Equation 2, the vibration frequency of the haptic feedback device 100 may be reduced by increasing the mass of the vibrating object. Therefore, the vibration frequency of the haptic feedback device 100 may be reduced by adding a first mass member 40 to the vibrating member 10 or adding a second mass member 50 to the first mass member 40.

The present embodiment of the invention is to achieve these effects, and may provide the mass member of which amass may be controlled.

The first mass member 40 according to the present embodiment of the invention may include a plurality of insertion holes 42. The insertion holes 42 may be formed in the length direction (X-axis direction based on FIG. 7) of the first mass member 40 and may have a size into which another mass body may be inserted. That is, the plurality of second mass members 50 having a predetermined mass may be selectively inserted into the insertion holes 42.

Herein, a portion of the second mass members 50 may first be inserted during the manufacturing process of the haptic feedback device 100 and the remainder thereof may be selectively inserted during the controlling of the vibration frequency of the haptic feedback device 100. Further, the second mass members 50 inserted into the first mass member 40 may be selectively removed during the controlling of the vibration frequency of the haptic feedback device 100.

For example, when the vibration frequency of the haptic feedback device 100 is lower than the predetermined vibration frequency band, the second mass members 50 inserted into the first mass member 40 may be removed.

On the other hand, when the vibration frequency of the haptic feedback device 100 is higher than the predetermined vibration frequency band, the second mass members 50 may be additionally inserted into the insertion holes 42 of the first mass member 40.

According to the present embodiment, the mass of the mass member is increased and reduced to control the vibration frequency of the haptic feedback device 100, such that the vibration frequency may be easily changed.

Meanwhile, as shown in FIGS. 8 and 9, the coupling structure of the first mass member 40 and the second mass member 50 may be modified such that the second mass member 50 may be stacked on the first mass member 40 in a vertical direction (an Z-axis direction based on FIG. 8) or the second mass member 50 may be coupled to the first mass member 40 in the length direction (an X-axis direction based on FIG. 9) of the first mass member 40.

In the modified example shown in FIG. 8, the first mass member 40 may be provided with protrusions 44 and the second mass member 50 may be provided with holes 52. In this modified example, the second mass member 50 may be stacked on the first mass member 40 in a thickness direction thereof (the Z-axis direction based on FIG. 8) by the coupling of the protrusions 44 and the holes 52. Here, the protrusions 44 of the first mass member 40 may be extended to a predetermined length so that the plurality of second mass members 50 may be stacked.

In the modified example shown in FIG. 9, the first mass member 40 may be provided with grooves 46 and the second mass member 50 may be provided with protrusions 54 and grooves 56. In this modified example, the second mass member 50 may be connected to the first mass member 40 in the length direction thereof (the X-axis direction based on FIG. 9) by the coupling of the protrusions 46 and the grooves 54. Here, the second members 50 may be consecutively connected if necessary.

Meanwhile, the above-mentioned embodiment describes that the second mass member 50 is described in a solid shape having a considerable volume and mass; however, the second mass member 50 may be a liquid material having a predetermined mass.

For example, the second mass member may be a curable resin curable at room temperature or an adhesive. The second mass member having the above-mentioned type may be easily used to finely control the vibration frequency of the haptic feedback device.

Next, a haptic feedback device according to a third embodiment of the present invention will be described with reference to FIGS. 10 and 11.

The vibrating member 10 according to the present embodiment of the invention may include a first body 17 and a plurality of second bodies 18. In other words, the vibrating member 10 may have a structure in which the plurality of second bodies 18 are formed at both ends of the single first body 17.

The first body 17 is formed in a central portion of the vibrating member 10 and the second bodies 18 may be formed at both ends of the vibrating member 10.

Here, the second bodies 18 may be connected to the cases 102 and 104. To this end, the second bodies 18 may have a plurality of holes 12 (see FIG. 11). Further, the plurality of second bodies 18 may be selectively connected to the cases 102 and 104. For example, one of the three second bodies 18 may be connected to the cases 102 and 104 or two of the three second bodies 18 may be connected to the cases 102 and 104. Alternatively, all of the three second bodies 18 may be connected to the cases 102 and 104.

Therefore, according to the present embodiment of the invention, the spring constant of the vibrating member 10 may be controlled by adjusting the number of second bodies 18 connected to the cases 102 and 104.

For example, when the spring constant of the first body 17 is set to K1 and the spring constant of the second bodies 18 is set to K2, the spring constant K of the vibrating member 10 may be represented by the following Equation 3:

$$\frac{1}{K} = \frac{1}{(K2+K2+K2)} + \frac{1}{K1} + \frac{1}{(K2+K2+K2)} \quad \text{Equation 3}$$

That is, since the vibrating member 10 has a structure in which a single first portion 10a formed as the single first body 17 is serially-connected to two second portions 10b in which three second bodies 18 are connected in parallel, the spring constant K of the vibrating member 10 may be represented by a resultant force of K1 and K2.

Here, the spring constant of the second portion 10b is increased or reduced according to the number of second bodies 18 to be substantially connected to the cases 102 and 104 such that the spring constant K of the vibrating member 10 may be increased or reduced accordingly. That the present embodiment of the invention may control the vibration frequency of the haptic feedback device 100 by changing the number of second bodies 18 connected to the cases 102 and 104.

For example, when the cases 102 and 104 are connected to the two second bodies 18, the spring constant K of the vibrating member 10 may be represented by the following Equation 4. In this case, since the spring constant K of the vibrating member 10 is less than the spring constant according to Equation 3, the vibration frequency of the haptic feedback device 100 may be lower than the above-mentioned case.

$$\frac{1}{K} = \frac{1}{(K2+K2)} + \frac{1}{K1} + \frac{1}{(K2+K2)} \quad \text{Equation 4}$$

As another example, when the cases 102 and 104 are connected to one second body 18, the spring constant K of the vibrating member 10 may be represented by the following Equation 5. In this case, since the spring constant K of the vibrating member 10 is less than the spring constant according to Equation 4, the vibration frequency of the haptic feedback device 100 may be lower than the above-mentioned case.

$$\frac{1}{K} = \frac{1}{K2} + \frac{1}{K1} + \frac{1}{K2} \quad \text{Equation 5}$$

Therefore, according to the embodiment of the present invention, the vibration frequency of the haptic feedback device 100 may be easily controlled by controlling the number of second bodies 18 connected to the cases 102 and 104.

Meanwhile, although FIGS. 10 and 11 show the three second bodies 18, the number of second bodies may be increased or reduced according to the size of the vibrating member 10. For reference, when a plurality of second bodies are provided, the spring constant K of the vibrating member 10 may be more finely controlled.

A haptic feedback device according to a fourth embodiment of the present invention will be described with reference to FIGS. 12 and 13.

The haptic feedback device 100 according to the fourth embodiment of the present invention may include the vibrating member 10, the vibrating element 20, the first mass member 40, the upper case 102, and the lower case 104 and may further include the second mass member 50, a flexible substrate 70, and a plurality of buffering members 82, 84, and 86.

The vibrating member 10 may include a first plate member 10a and a second plate member 10b.

The first plate member 10a and the second plate member 10b may be elongated in a first direction (an X-axis direction based on FIG. 12). Here, the second plate member 10b may be formed at both sides of the first plate member 10a and may be disposed in a bent state in a second direction (a Z-axis direction based on FIG. 12) with respect to the first plate member 10a. That is, the first plate member 10a and the second plate member 10b may be perpendicularly disposed with regard to each other.

The vibrating member 10 may be manufactured by performing a pressing process on a single plate member and then, bending the second plate member 10b with respect to the first plate member 10a.

The first mass member 40 may be fixed to the vibrating member 10. Specifically, the first mass member 40 may be mounted on the vibrating member 10 via the second plate member 10b. In other words, the first mass member 40 may be fixed to the vibrating member 10 via the second plate member 10b.

The upper case 102 and the lower case 104 may have a receiving space in which the first mass member 40 is received and may be coupled to the first plate member 10a. The coupling of the upper case 102 or the lower case 104 and the first plate member 10a may be made by a press-fit coupling process using protrusions and grooves, a welding process, or a bonding process using an adhesive.

Meanwhile, one surface (an upper surface based on FIG. 12) of the upper case 102 may be provided with the receiving grooves 106. The receiving grooves 106 may be formed to completely penetrate through the upper case 102. Therefore, one surface (upper surface) of the first mass member 40 may communicate with the outside through the receiving grooves 106 and may be coupled to another member (for example, the second mass member 50) through the receiving grooves 106.

The flexible substrate 70 may be connected to the vibrating element 20 and may send electrical signals to the vibrating element 20. The coupling of the flexible substrate 70 and the vibrating element 20 may be made by a conductive adhesive. For example, the flexible substrate 70 may be coupled to the vibrating element 20 by an anisotropic conductive film (ACF).

The buffering members 82, 84, and 86 may be formed on the vibrating member 10, the first mass member 40, or the cases 102 and 104 and may absorb external impacts. The buffering members 82, 84, and 86 may be omitted as needed or may be functioned as the second mass member.

As shown in FIG. 13, the second mass member 50 may be formed in the first mass member 40 through the receiving groove 106. The second mass member 50 may be a liquid material. Specifically, the second mass member 50 may be a resin material curable at room temperature or an adhesive. The amount of the liquid-type second mass member 50 may be controlled to the level of a relatively small unit of mass and therefore, the vibration frequency of the haptic feedback device 100 may be finely controlled.

Therefore, the embodiment of the present invention may be usefully employed when the vibration frequency needs to be finely controlled or a width of the desired vibration frequency band is significantly narrow.

The vibrating member 10 may have a plurality of welding points 90 as shown in FIG. 14. The plurality of welding points 90 may be provided to reduce or increase the substantially vibrated length of the vibrating member 10 and therefore, the vibration frequency of the haptic feedback device 100 may be changed. Therefore, the haptic feedback device 100 according to the embodiment of the present invention may control the vibration frequency thereof by changing the welding points 90 of the vibrating member 10.

As set forth above, according to embodiments of the present invention, a vibration frequency of a haptic feedback device may be calibrated or controlled by controlling a length of a vibrating member (substantially vibrated length) and a mass of a mass member.

Therefore, the vibration frequency of the haptic feedback device may be easily changed to a predetermined vibration frequency band even in the case that a vibrating member or a mass member outside of a tolerance range is used.

While the present invention has been shown and described in connection with the embodiments, it will be apparent to those skilled in the art that modifications and variations can be made without departing from the spirit and scope of the invention as defined by the appended claims.

What is claimed is:

1. A haptic feedback device, comprising:
a vibrating member coupled to a fixed body; and
a vibrating element formed on the vibrating member to vibrate the vibrating member,
wherein the vibrating member and the fixed body are coupled at a plurality of fixed points able to be variably positioned to allow a length of the vibrating member, vibrated by the vibrating element, to be changed.

2. The haptic feedback device of claim 1, wherein the plurality of fixed points are formed in a length direction of the vibrating member.

3. The haptic feedback device of claim 1, wherein the plurality of fixed points are welding points at which the vibrating member is bonded to the fixed body.

4. The haptic feedback device of claim 1, wherein the plurality of fixed points are holes formed in the vibrating member.

5. The haptic feedback device of claim 1, wherein the plurality of fixed points are grooves formed in end portions of the vibrating member.

6. The haptic feedback device of claim 1, further comprising a first mass member provided to the vibrating member.

7. The haptic feedback device of claim 6, wherein the first mass member has a coupling structure so as to be coupled to a second mass member.

8. The haptic feedback device of claim 7, wherein the first mass member includes an insertion hole into which the second mass member is inserted.

9. The haptic feedback device of claim 7, wherein the first mass member includes a protrusion or a groove so as to be coupled to the second mass member, and
the second mass member includes a groove or a protrusion corresponding to the protrusion or the groove of the first mass member.

10. The haptic feedback device of claim 7, wherein the second mass member is an adhesive having a predetermined mass, and
the first mass member includes a receiving space for the adhesive.

11. A haptic feedback device, comprising:
a vibrating member; and
a vibrating element formed on the vibrating member to vibrate the vibrating member,
wherein the vibrating member has a structure in which a plurality of vibrating plates are connected in parallel in a width direction of the vibrating member.

12. The haptic feedback device of claim 11, wherein the vibrating member is divided into the plurality of vibrating plates by a separating groove extending in a length direction of the vibrating member.

13. The haptic feedback device of claim 11, wherein the plurality of vibrating plates are provided with a plurality of holes in a length direction thereof.

14. The haptic feedback device of claim 11, wherein the plurality of vibrating plates are integrally formed with the vibrating member by a pressing process.

15. The haptic feedback device of claim 11, further comprising a first mass member provided to the vibrating member.

16. The haptic feedback device of claim 15, further comprising a second mass member having a predetermined mass, wherein the second mass member is an adhesive so as to be bonded to the first mass member.

17. The haptic feedback device of claim 15, wherein the first mass member has a coupling structure so as to be coupled to the second mass member.

18. The haptic feedback device of claim 17, wherein the first mass member includes an insertion hole into which the second mass member is inserted.

19. The haptic feedback device of claim 17, wherein the first mass member includes a protrusion or a groove so as to be coupled to the second mass member, and
the second mass member includes a groove or a protrusion corresponding to the protrusion or the groove of the first mass member.

20. A haptic feedback device, comprising:
a vibrating member;
a vibrating element formed on the vibrating member to vibrate the vibrating member;
a first mass member provided to the vibrating member; and
a second mass member selectively coupled to the first mass member.

21. The haptic feedback device of claim 20, wherein the first mass member includes an insertion hole into which the second mass member is inserted.

22. The haptic feedback device of claim 20, wherein the first mass member includes a protrusion or a groove so as to be coupled to the second mass member, and the second mass member includes a groove or a protrusion corresponding to the protrusion or the groove of the first mass member.

23. The haptic feedback device of claim 20, wherein the vibrating member includes:

a first plate member elongated in a first direction; and a pair of second plate members extended from both sides of the first plate member and bent in a second direction perpendicular to the first direction so as to be coupled to the first mass member.

24. The haptic feedback device of claim 20, further comprising an upper case and a lower case receiving the first mass member and the vibrating member.

25. The haptic feedback device of claim 24, wherein the upper case includes a receiving groove.

26. The haptic feedback device of claim 25, wherein the second mass member having a predetermined mass and being curable at room temperature is provided in the first mass member through the receiving groove.

27. A haptic feedback device, comprising:

a vibrating member coupled to a fixed body while having a first vibrating length due to a first fixed point;

a vibrating element formed on the vibrating member to vibrate the vibrating member; and at least one second fixed point at which the vibrating member is coupled to the fixed body while having a second vibrating length different from the first vibrating length.

* * * * *